United States Patent
Arai

(10) Patent No.: US 6,681,040 B2
(45) Date of Patent: *Jan. 20, 2004

(54) APPARATUS AND METHOD FOR COLOR RANGE DESIGNATION, AND COMPUTER READABLE MEDIUM FOR COLOR RANGE DESIGNATION

(75) Inventor: Yasuyuki Arai, Inagi (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,878

(22) Filed: Apr. 7, 1999

(65) Prior Publication Data

US 2003/0161528 A1 Aug. 28, 2003

(30) Foreign Application Priority Data

Jul. 8, 1998 (JP) .......................................... 10-193279

(51) Int. Cl.[7] ................................................. G06K 9/00
(52) U.S. Cl. ........................................ 382/162; 348/587
(58) Field of Search ................................. 382/162, 165, 382/167, 283, 284, 282; 348/586–587, 592, 597, 672, 649; 345/536, 589, 592–594, 597; 358/540, 450, 537, 452

(56) References Cited

U.S. PATENT DOCUMENTS

| | | | |
|---|---|---|---|
| 5,774,191 A | | 6/1998 | Iverson ........................ 348/592 |
| 5,838,310 A | * | 11/1998 | Uya ............................ 345/536 |
| 6,023,302 A | * | 2/2000 | MacInnis et al. ............ 348/597 |
| 6,262,778 B1 | * | 5/2001 | Nonweiler et al. .......... 348/586 |
| 6,229,580 B1 | * | 7/2001 | Inoue .......................... 348/649 |

OTHER PUBLICATIONS

Software: "Image Assistant", OmniPage Professional, Caere Corporation, pp. 16–17.

* cited by examiner

Primary Examiner—Leo Boudreau
Assistant Examiner—Ishrat Sherali
(74) Attorney, Agent, or Firm—Staas & Halsey LLP

(57) ABSTRACT

In a color range designation apparatus and method, a designation pixel of a display image is input, and a color of the designation pixel of the display image is determined. A range between a minimum color and a maximum color for the input designation pixel is determined based on the color determined.

16 Claims, 11 Drawing Sheets

FIG. 10

|     | R    | G    | B    |
|-----|------|------|------|
| min | rmin | gmin | bmin |
| max | rmax | gmax | bmax |

FIG. 11A

|     | R | G | B |
|-----|---|---|---|
| min | 0 | 0 | 0 |
| max | 0 | 0 | 0 |

FIG. 11B

|     | R | G   | B   |
|-----|---|-----|-----|
| min | 0 | 192 | 255 |
| max | 0 | 192 | 255 |

FIG. 11C

|     | R   | G   | B   |
|-----|-----|-----|-----|
| min | 0   | 192 | 55  |
| max | 128 | 200 | 255 |

APPARATUS AND METHOD FOR COLOR RANGE DESIGNATION, AND COMPUTER READABLE MEDIUM FOR COLOR RANGE DESIGNATION

BACKGROUND OF THE INVENTION

(1) Field of the Invention

The present invention generally relates to an apparatus and method for color range designation, and a computer readable medium for color range designation. The present invention more particularly relates to a color range designation apparatus, method and computer readable medium in which a color range for a portion of a display image is designated and the image with the designated color range is processed for displaying.

(2) Description of the Related Art

Conventionally, an image-compositing technique, such as chroma keying, is commonly used on image signals. An overlay image signal is selected instead of a background image signal whenever the overlay is not a particular preset hue, usually blue. Action shot in front of a blue screen can thereby appear on the top of the background signal. This image-compositing process is also called a blue-back process.

Before the above image-compositing process is performed, it is necessary to preset the background image signal to a particular color.

FIG. 1 shows a conventional image processing routine of the above type.

At a start of the conventional image processing routine of FIG. 1, step S1-1 performs a color designation processing. In the color designation processing, a particular color is designated for a portion of a display image. After the color designation processing is performed, step S1-2 performs a color range designation processing. In the color range designation processing, a range between a minimum color and a maximum color is designated for the portion of the display image based on the designation color. After the color range designation processing is performed, step S1-3 performs an image displaying processing. In the image displaying processing, the resulting image with the designated color range is displayed.

FIG. 2 shows a color designation processing in the conventional image processing routine.

In the color designation processing of FIG. 2, step S2-1 initializes a designation color for a portion of an original display image in response to a color designation request input by an operator. After the designation color is initialized at step S2-1, step S2-2 detects whether a designation color is input by the operator. The detection at step S2-2 is repeated until a designation color is input by the operator. After the designation color is input at step S2-2, step S2-3 stores the designation color in a memory. The color designation processing of FIG. 2 ends.

FIG. 3 shows a color range designation processing in the conventional image processing routine.

In the color range designation processing of FIG. 3, step S3-1 initializes a range between a minimum color and a maximum color for the portion of the original display image in response to the designation color input by the operator. After the color range is initialized at step S3-1, step S3-2 detects whether a designated color range (or a color difference with respect to the designation color) is input by the operator. The detection at step S3-2 is repeated until a designated color range (or a color difference) is input by the operator. After the designated color range (or the color difference) is input at step S3-2, step S3-3 calculates a minimum color of the designated color range from a difference of the designation color and the color difference, and calculates a maximum color of the designated color range from a sum of the designation color and the color difference. After the calculation at step S3-3 is performed, step S-4 stores the designated color range, including the minimum color and the maximum color, in the memory. The color range designation processing of FIG. 3 ends.

FIG. 4 shows an image displaying processing in the conventional image processing routine.

In the image displaying processing of FIG. 4, step S4-1 initializes the portion of the original display image in response to the designated color range determined by the color range designation processing. After the portion of the original display image is initialized at step S4-1, step S4-2 performs an image displaying of the image with the designated color range. In the image displaying, the image signal for the portion of the original display image is preset to the designation color, and the resulting image is displayed. After the resulting image is displayed at step S4-2, step S4-3 detects whether a change to the designation color is input by the operator. When a change to the designation color is input by the operator at step S4-3, the above step S4-2 is again performed. On the other hand, when no change is input by the operator, the image displaying processing of FIG. 4 ends.

FIG. 5 shows an operation of the conventional image processing routine.

As shown in FIG. 5, in the conventional image processing routine, a central color "C0" of a designated color range is determined by the designation color input by the operator, and a color difference "dC" with respect to the central color "C0" is determined by the designated color range input by the operator. A minimum color "C1" of the designated color range is automatically calculated from the central color C0 and the color difference "dC" in accordance with the equation C1=(C0−dC), and a maximum color "C2" of the designated color range is automatically calculated from the center color "C0" and the color difference "dC" in accordance with the equation C2=(C0+dC).

In the conventional image processing routine, the range between the minimum color and the maximum color is automatically determined from the central color and the color difference which are input by the operator. The resulting color range may not accord with a color range desired by the operator. It is difficult for the operator to easily designate a color range at a portion of a display image by a desired color range at the operator's discretion.

SUMMARY OF THE INVENTION

An object of the present invention is to provide an improved color range designation apparatus and method in which the above-mentioned problems are eliminated.

Another object of the present invention is to provide a color range designation apparatus which allows an operator to easily designate a color range at a portion of a display image by a desired color range at the operator's discretion.

Still another object of the present invention is to provide a color range designation method which allows an operator to easily designate a color range at a portion of a display image by a desired color range at the operator's discretion.

A further object of the present invention is to provide a computer readable medium storing program code instructions which cause a processor to execute a color range designation that allows an operator to easily designate a color range at a portion of a display image by a desired color range at the operator's discretion.

The above-mentioned objects of the present invention are achieved by a color range designation apparatus including: a color designation unit which inputs a designation pixel of a display image and determines a color of the designation pixel of the display image; and a color range data calculating unit which determines a range between a minimum color and a maximum color for the input designation pixel based on the color determined by the color designation unit.

The above-mentioned objects of the present invention are achieved by a color range designation method including the steps of: determining a color of a pixel of a display image by an input designation pixel; and determining a range between a minimum color and a maximum color for the input designation pixel based on the determined color.

The above-mentioned objects of the present invention are achieved by a computer readable medium storing program code instructions which cause a processor to execute a color range designation, including a program code device which causes the processor to determine a color of a designation pixel of a display image by an input designation color; and a program code device which causes the processor to determine a range between a minimum color and a maximum color for the input designation pixel based on the determined color.

In the color range designation apparatus and method of a preferred embodiment of the present invention, the color range data calculating unit determines a range between a minimum color and a maximum color for a pixel of a display image based on the designation pixel input by the operator. The color range designation apparatus allows the operator to easily designate a color range at the designation pixel of the display image by a desired color range at the operator's discretion.

In the color range designation apparatus and method of the preferred embodiment, the color designation unit inputs an arbitrary one of pixels of the display image as the designation pixel. The color range designation apparatus allows the operator to easily designate a color range at the arbitrary one of pixels of the display image by a desired color range at the operator's discretion.

In the color range designation apparatus and method of the preferred embodiment, the color designation unit sequentially inputs a number of arbitrary pixels among pixels of the display image as the designation pixel. The color range designation apparatus allows the operator to easily designate a color range at each of the arbitrary pixels of the display image by a desired color range at the operator's discretion.

In the color range designation apparatus and method of the preferred embodiment, the color designation unit inputs a designation range of the display image, so that a number of pixels contained in the designation range are sequentially input as the designation pixel. The color range designation apparatus allows the operator to easily designate a color range at each of the arbitrary pixels of the display image by a desired color range at the operator's discretion.

In the color range designation apparatus and method of the preferred embodiment, when a different designation color, input by the color designation unit for the designation pixel, falls outside the stored color range, the color range data calculating unit determines a range between a minimum color and a maximum color for the designation pixel based on the different designation color, so that the stored color range is renewed by the determined color range. The color range designation apparatus allows the operator to easily designate a color range at the designation pixel of the display image by a desired color range at the operator's discretion.

BRIEF DESCRIPTION OF THE DRAWINGS

Other objects, features and advantages of the present invention will be more apparent from the following detailed description when read in conjunction with the accompanying drawings in which:

FIG. 10 is a diagram for explaining a configuration of a color range data stored by a color range data storing block in the color range designation routine;

FIG. 11A, FIG. 11B and FIG. 11C are diagram for explaining a color range data generating operation of the color range data storing block;

DETAILED DESCRIPTION OF THE PREFERRED EMBODIMENT

A description will now be given of the preferred embodiments of the present invention with reference to the accompanying drawings.

Figure 1:
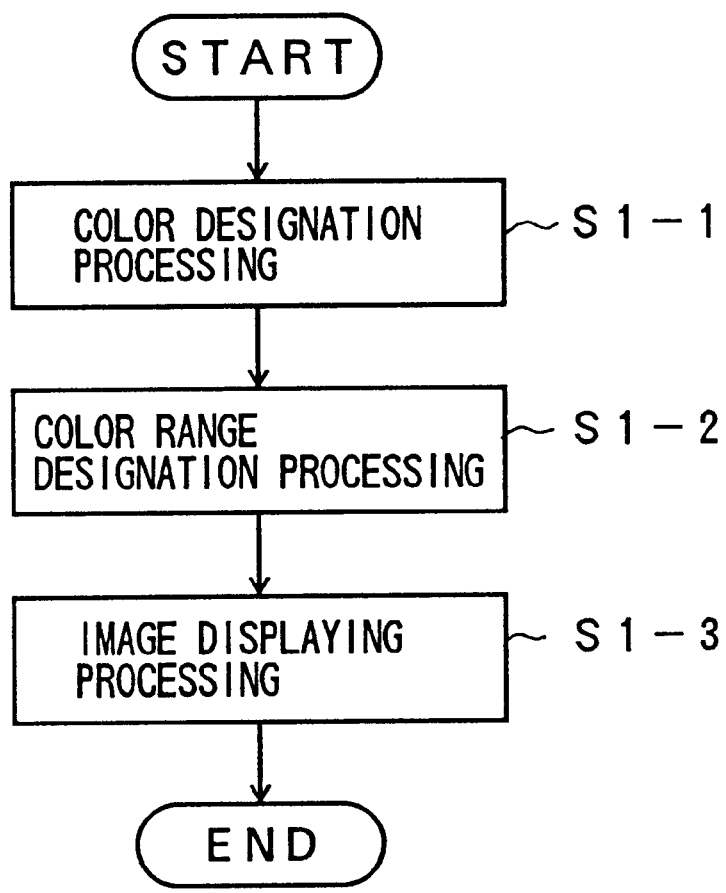
FIG. 1 is a flowchart for explaining a conventional image processing routine.
Figure 2:
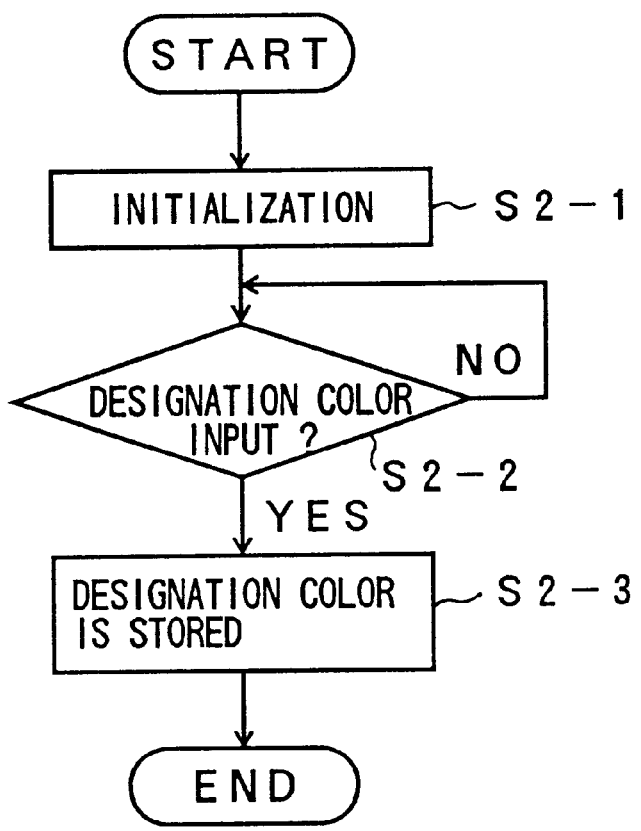
FIG. 2 is a flowchart for explaining a color designation processing in the conventional image processing routine.
Figure 3:
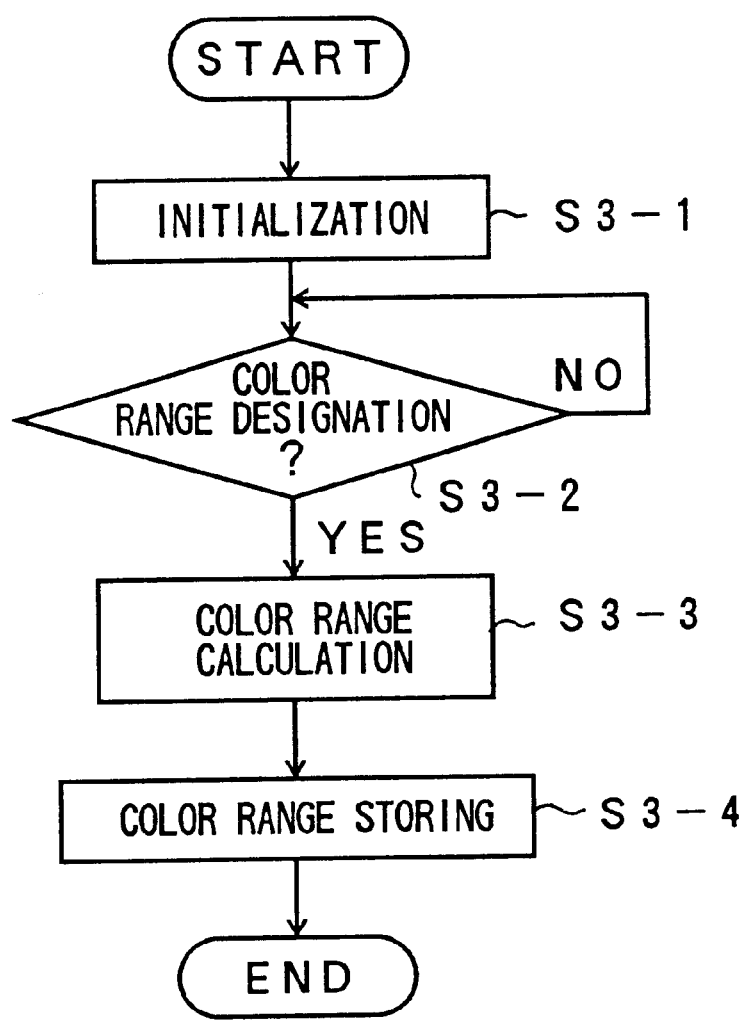
FIG. 3 is a flowchart for explaining a color range designation processing in the conventional image processing routine.
Figure 4:
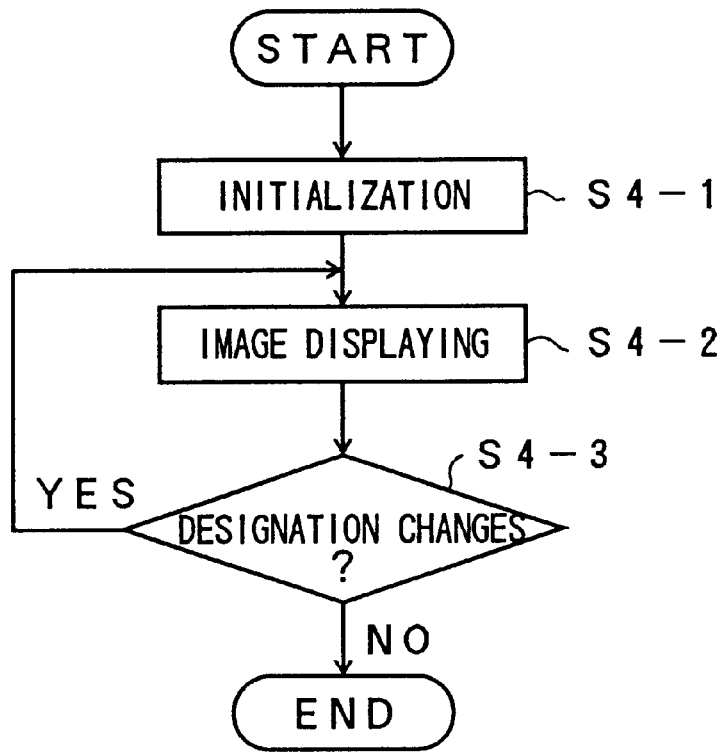
FIG. 4 is a flowchart for explaining an image display processing in the conventional image processing routine.
Figure 5:
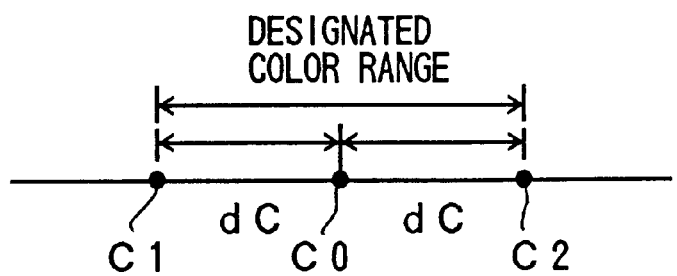
FIG. 5 is a diagram for explaining an operation of the conventional image processing routine.
Figure 6:
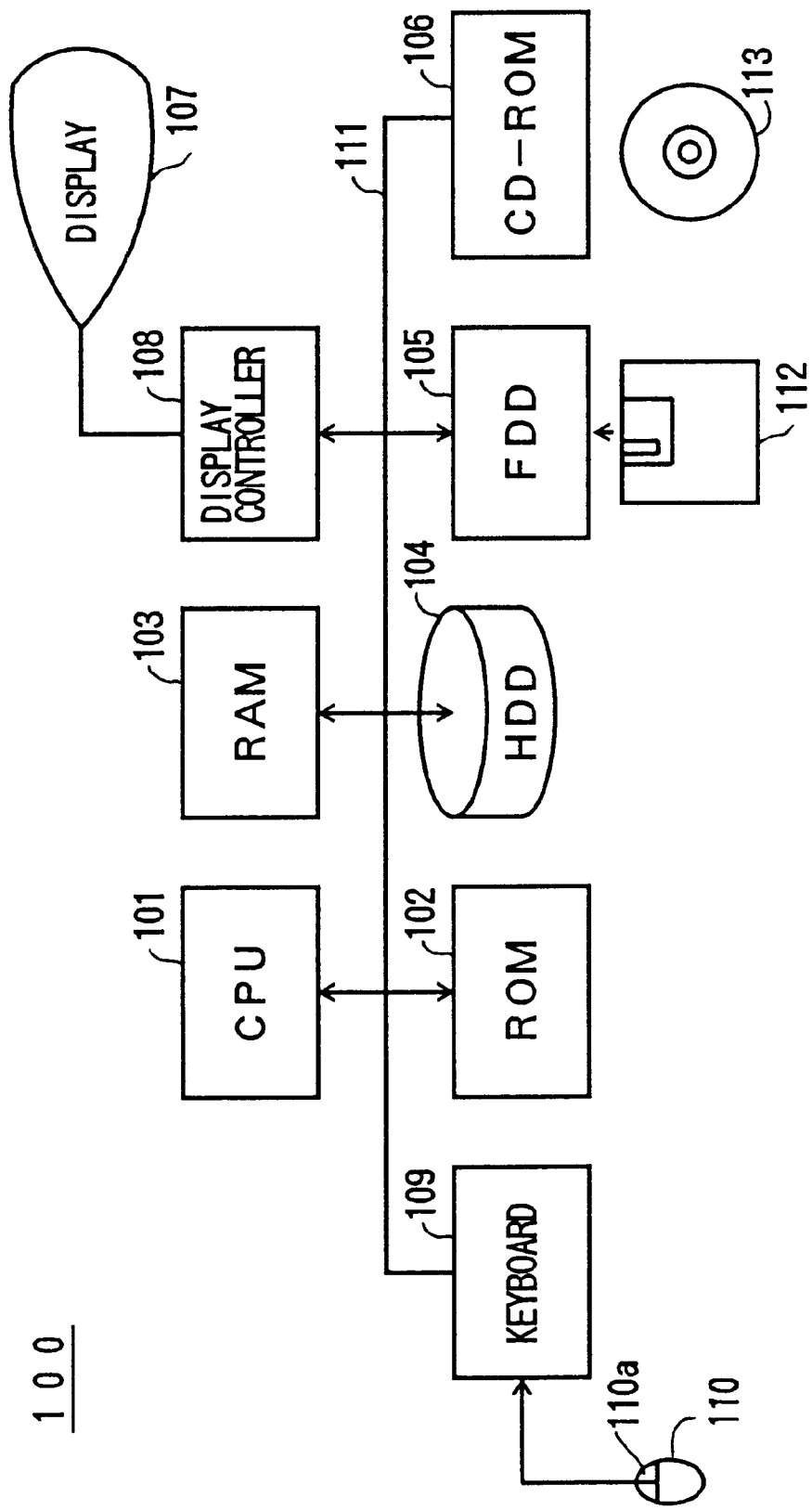
FIG. 6 is a block diagram of an image processing system to which an embodiment of a color range designation apparatus of the present invention is applied.

FIG. 6 shows a computer-graphics image processing system 100 to which an embodiment of the color range designation apparatus of the present invention is applied.

As shown in FIG. 6, the image processing system 100 generally has a CPU (central processing unit) 101, a ROM (read-only memory) 102, a RAM (random access memory) 103, an HDD (hard disk drive) 104, an FDD (floppy disk drive) 105, a CD-ROM drive 106, a display 107, a display controller 108, a keyboard 109, a mouse 110, and a bus 111.

In the image processing system 100 of FIG. 6, the CPU 101 performs data processing in accordance with a program that is read from the HDD 104 and expanded to the RAM 103. A starting program and default values are stored in the ROM 102. When the image processing system 100 starts operation, the starting program and the default values are read from the ROM 102. The RAM 103 retains programs and necessary data, and provides a work area for the CPU 101 when the data processing is performed.

The HDD 104 retains programs and data recorded to magnetic recording media of the HDD 104. The CPU 101 transmits a read command to the HDD 104 via the bus 111, and the program and necessary data are read from the HDD 104 in accordance with the read command. Further, the CPU 101 transmits a write command to the HDD 104 via the bus 111, and processed data is written to the data stored in the HDD 104 in accordance with the write command.

A floppy disk 112 is loaded into the FDD 105. A program and necessary data may be retained in the floppy disk 112. The CPU 101 transmits a read command to the FDD 105 via the bus 111, and the program and necessary data are read from the FDD 105 in accordance with the read command. Further, the CPU 101 transmits a write command to the FDD 105 via the bus 111, and processed data is written to the data stored in the FDD 105 in accordance with the write command.

A CD-ROM 113 is loaded into the CD-ROM drive 106. A program and necessary data may be retained in the CD-ROM 113. The CPU 101 transmits a read command to the CD-ROM disk drive 106 via the bus 111, and the program and necessary data are read from the CD-ROM 113 in accordance with the read command.

The display 107 is constituted by a CRT (cathode ray tube) monitor. The display 107 is connected through the display controller 108 to the bus 111. The display controller 108 controls the processing of a display image on the CRT monitor of the display 107 in accordance with the display image data supplied through the bus 111.

The keyboard 109 is constituted by a plurality of input keys. A program execution instruction or a specific input data, such as an input designation color, may be input to the CPU 101 by using the input keys of the keyboard 109. The mouse 110 includes a mouse button 110a. The mouse 110 is used to move the pointer indicated on the monitor of the display 107. An operational command or a program execution instruction may be input to the CPU 101 by clicking the mouse button 110a.

Figure 7:
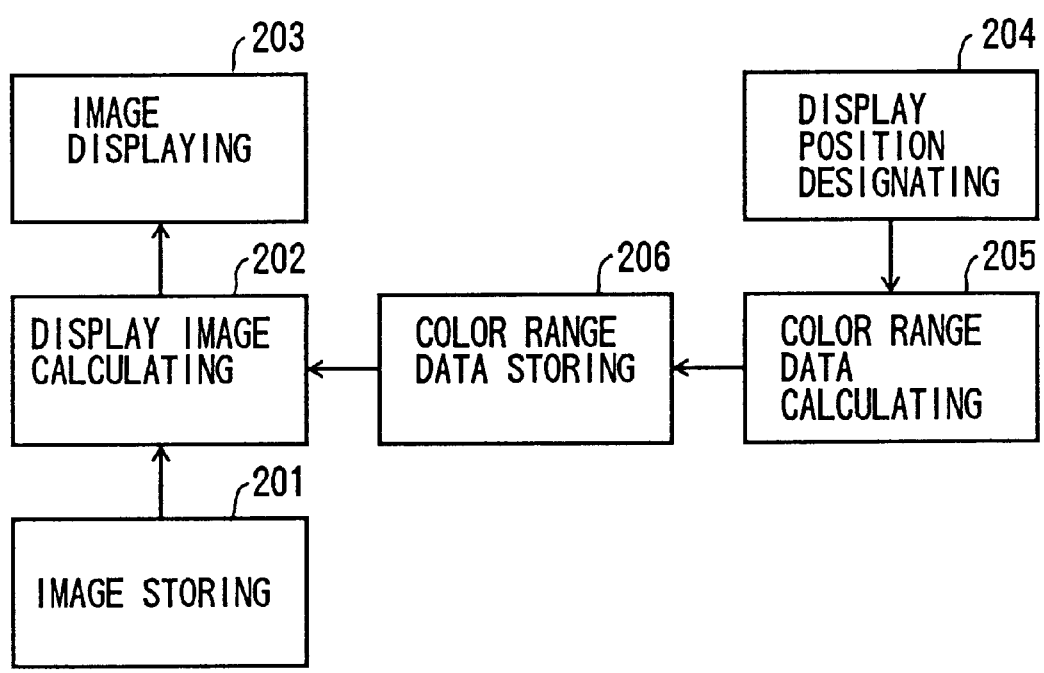
FIG. 7 is a block diagram of an embodiment of a color range designation routine of the present invention.

FIG. 7 is a block diagram of an embodiment of a color range designation routine of the present invention.

The color range designation routine 200 of the present embodiment includes, as shown in FIG. 7, an image storing block 201, a display image calculating block 202, an image displaying block 203, a display position designating block 204, a color range data calculating block 205, and a color range data storing block 206. In the present embodiment, the program stored in the HDD 104 causes the CPU 101 to execute the color range designation routine 200.

In the present embodiment, an image displaying processing program related to the block diagram of FIG. 7 (which will be described later) is program code instructions stored in the HDD 104 of the image processing system 100 of FIG. 6. Alternatively, the image displaying processing program related to the block diagram of FIG. 7 may be stored in the ROM 102, the RAM 103, the floppy disk 112 of the FDD 105 or the CD-ROM 113 of the CD-ROM disk drive 106. These memories correspond to a computer readable medium in the claims. The computer readable medium includes any instruction storage device, such as, for example, magnetic disks including floppy disks, optical disks including CD-ROMs, magneto-optical disks including MOs, semiconductor memory cards such as IC cards and miniature cards and other types of computer usable devices and media.

In the present embodiment, the memory of the image processing system 100 may store encoded or non-encoded instructions. The program code instructions may be first installed from the floppy disk 112 or the CD-ROM 113 to the HDD 104, transferred to the RAM 103, and then read by the CPU 101. The memory of the image processing system 100 may store either all or a part of the program code instructions related to the block diagram of FIG. 7. Further, the program code instructions may be first installed from a communication device (not shown) to the HDD 104 of the image processing system 100, transferred to the RAM 103, and then read by the CPU 101.

Hereinafter, the CPU 101 of the image processing system 100 will be called the processor.

In the color range designation routine 200 of FIG. 7, the image storing block 201 causes the processor to store an original image to be processed. The display image calculating block 202 causes the processor to produce display image data from the stored image based on color range data stored by the color range data storing block 206, and to supply the display image data to the image displaying block 203.

The image displaying block 203 causes the processor to display an image on the monitor of the display 107 in accordance with the display image data. The display position designating block 204 causes the processor to input a designation color and a designation pixel of the display image from the keyboard 109 or the mouse 110.

The color range data calculating block 205 causes the processor to determine a range between a minimum color and a maximum color for the designation pixel based on the designation-color from the display position designating block 204. The color range data storing block 206 causes the processor to store, in the RAM 103, the color range data (the minimum color and the maximum color) determined for the designation pixel by the color range data calculating block 205.

Figure 8:
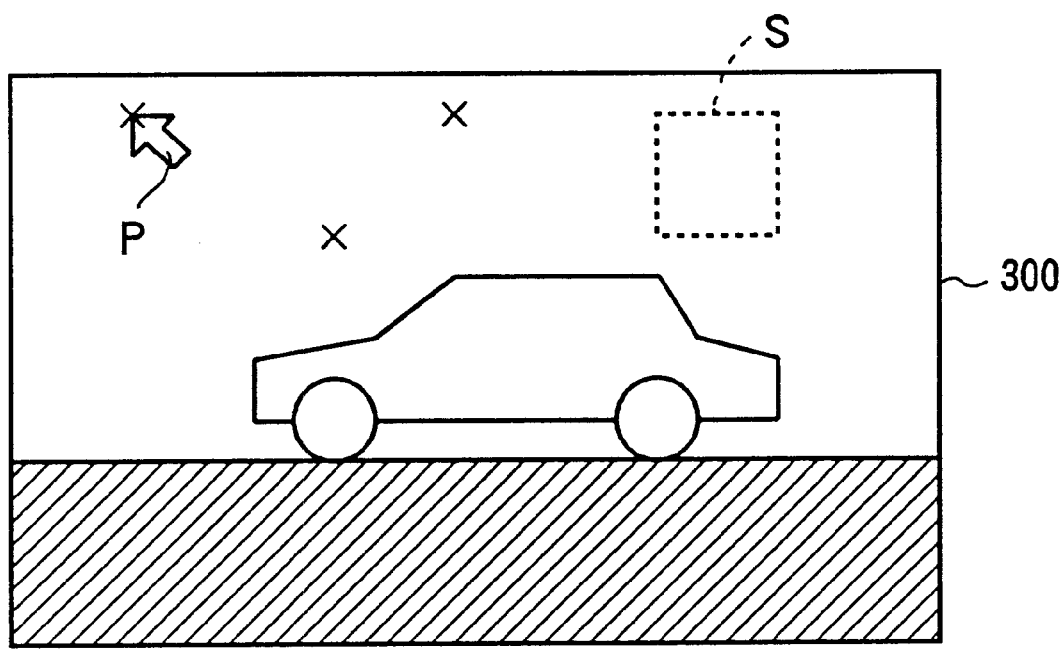
FIG. 8 is a diagram for explaining an operation of a display position designating block of the color range designation routine.

FIG. 8 is a diagram for explaining an operation of the display position designating block 204 of the color range designation routine 200.

As shown in FIG. 8, the operator manipulates the mouse 110 so that the pointer "P" is placed at a designation position on the monitor 300. The designation position on the monitor 300 can be arbitrarily selected by the operator. When the pointer P is placed at the designation position on the monitor 300, the operator clicks the mouse button 110a. Then, the display position designating block 204 causes the processor to input the designation pixel of the display image and the designation color. The designation pixel and the designation color are supplied to the color range data calculating block 205. Hence, the display position designating block 204 acts as a color designation unit which inputs a designation color and determines a color of a designation pixel of a display image by the input designation color.

Figure 9:
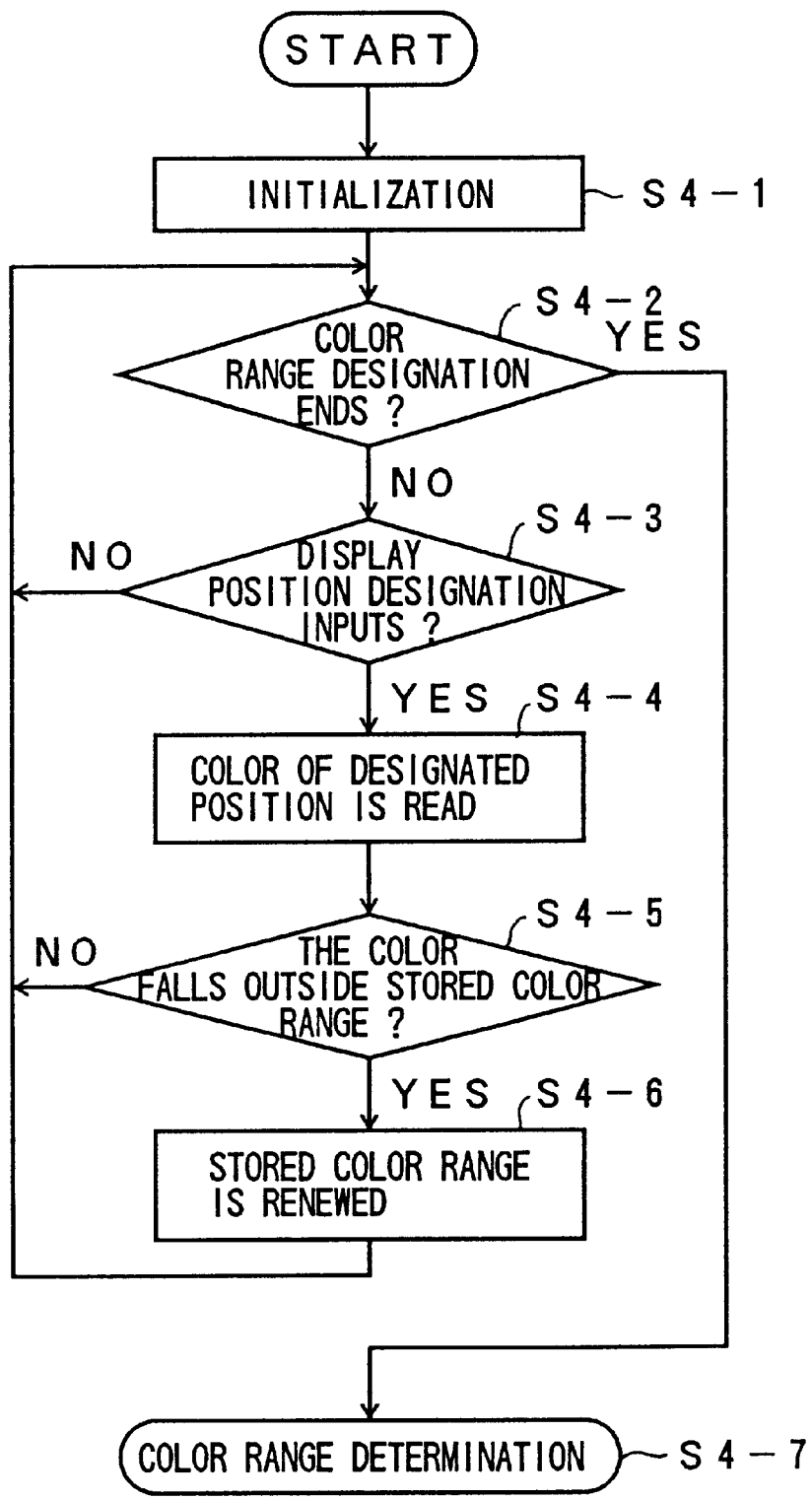
FIG. 9 is a flowchart for explaining a process of a color range data calculating block in the color range designation routine.

FIG. 9 shows a process of the color range data calculating block 205 of the color range designation routine 200 of FIG. 7.

The operator manipulates the mouse 110 so that the pointer "P" is moved to a color range designation button on the monitor 300, and the color range designation button is clicked with the mouse button 110a. At a start of the process of FIG. 9, the color range data calculating block 205 at step S4-1 causes the processor to initialize the color range data stored in the RAM 103.

After the color range data is initialized, the color range data calculating block 205 at step S4-2 causes the processor to determine whether a color range designation of the operator ends.

When the color range designation of the operator does not end at step S4-2, the color range data calculating block 205 at step S4-3 causes the processor to determine whether a display position on the monitor 300 is input by the operator as the designation pixel.

When the display position on the monitor 300 is designated at step S4-3, the color range data calculating block 205 at step S4-4 causes the processor to read a color of the designation pixel of the display image.

When the color of the designation pixel of the display image is read at step S4-4, the color range data calculating block 205 at step S4-5 causes the processor to determine whether the read color of the designation pixel falls outside a stored color range previously stored by the color range data storing block 206.

In the color range data storing block 206, a color of a pixel of the display image is defined by a set of primary colors RGB, and a range between a minimum color and a maximum color is determined with respect to each of the primary colors RGB for the designation pixel.

When the color of the designation pixel falls outside the previously stored color range at step S4-5, the color range data calculating block 205 at step S4-6 causes the processor to renew the previously stored color range by the color of the designation pixel. After the step S4-6 is performed, the step S4-2 is repeated.

When the display position on the monitor 300 is not designated at step S4-3 but the color range designation of the operator ends at step S4-2, the color range data calculating block 205 at step S4-7 causes the processor to determine a range between a minimum color and a maximum color for the designation pixel based on the designation color from the display position designating block 204.

FIG. 10 shows a configuration of a color range data stored by the color range data storing block 206.

As shown in FIG. 10, the color range data storing block 206 stores in the RAM 103 a color range between a minimum color and a maximum color which is determined with respect to each of the primary colors RGB for the designation pixel. That is, the color range data storing block 206 stores a range between a minimum color "rmin" and a maximum color "rmax" with respect to red R of the primary colors, a range between a minimum color "gmin" and a maximum color "gmax" with respect to green G of the primary colors, and a range between a minimum color "bmin" and a maximum color "bmax" with respect to blue B of the primary colors.

FIG. 11A, FIG. 11B and FIG. 11C show a color range data generating operation of the color range data storing block 206.

When the color range data stored in the RAM 103 is initialized at step 4-1, all the color range data items are set to zero as shown in FIG. 11A.

When the designation color is input for a single display position on the monitor 300 after the initialization, the color range data are set based on the input designation color. For example, when the designation color (R1, G1, B1)=(0, 192, 255) is input for a single display position on the monitor 300, the minimum colors (rmin, gmin, bmin) of the color range are set to (0, 192, 255) and the maximum colors (rmax, gmax, bmax) of the color range are set to (0, 192, 255) as shown in FIG. 11B. The resulting color range data are stored in the RAM 103 by the color range data storing block 206.

Suppose that, after the color range data are set based on the input designation color, a different designation color (R2, G2, B2) is input for the same display position on the monitor 300. The color range data (or the minimum colors and the maximum colors of the color range) are set based on the previous designation color (R1, G1, B1) and the current designation color (R2, G2, B2). That is, the smaller primary colors of the stored designation color (R1, G1, B1) and the current designation color (R2, G2, B2) are selected for the minimum colors (rmin, gmin, bmin) of the color range, while the larger primary colors of the stored designation color (R1, G1, B1) and the current designation color (R2, G2, B2) are selected for the maximum colors (rmax, gmax, bmax) of the color range.

For example, when the designation color (R2, G2, B2)=(128, 200, 55) is input for the display position on the monitor 300, the minimum colors (rmin, gmin, bmin) of the color range are set to (0, 192, 55) and the maximum colors (rmax, gmax, bmax) of the color range are set to (128, 200, 255) as shown in FIG. 11C. The resulting color range data are stored in the RAM 103 by the color range data storing block 206.

Accordingly, in the color range designation apparatus and method of the above-described embodiment, the color range data calculating block 205 determines a range between a minimum color and a maximum color for the designation pixel of the display image based on the designation color input by the operator. The color range designation apparatus and method of the above-described embodiment allows the operator to easily designate a color range at the designation pixel of the display image by a desired color range at the operator's discretion.

Figure 12:
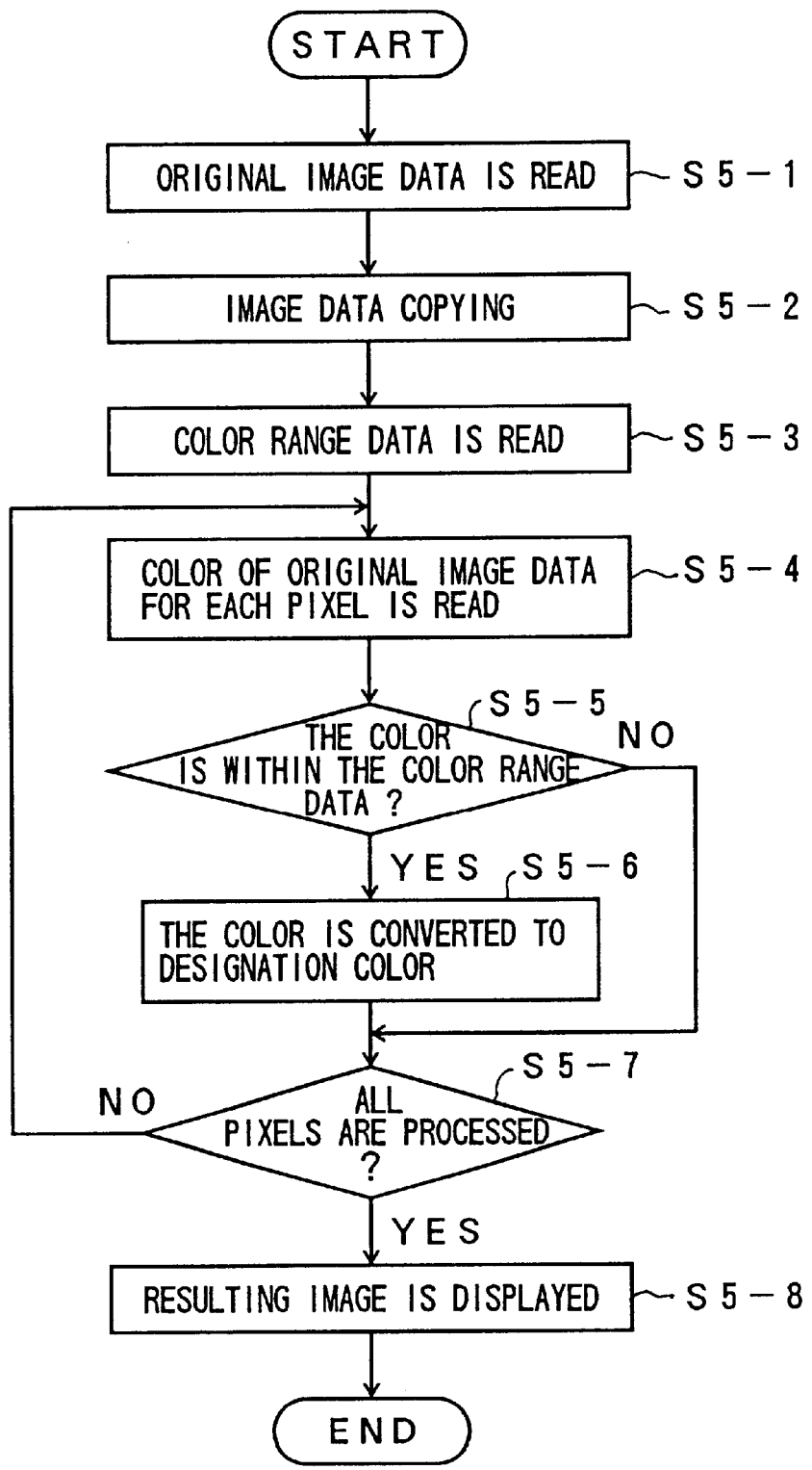
FIG. 12 is a flowchart for explaining a display image calculating block in the color range designation routine.

FIG. 12 shows a process of the display image calculating block 202 in the color range designation routine 200 of FIG. 7.

At a start of the process of FIG. 12, the display image calculating block 202 at step S5-1 causes the processor to read the original image data from the RAM 103. As previously described, the image storing block 201 stores the original image to be processed, in the RAM 103.

After the original image data is read, the display image calculating block 202 at step S5-2 causes the processor to copy the original image data to a work area of the display image calculating block 202. After the original image data is copied to the work area, the display image calculating block 202 at step S5-3 causes the processor to read the color range data from the RAM 103. As previously described, the color range data storing block 206 stores the color range data in the RAM 103.

After the color range data is read, the display image calculating block 202 at step S5-4 causes the processor to read a color of the original image data for each pixel. The display image calculating block 202 at step S5-5 causes the processor to detect whether the color, read at step S5-4, is within the color range data, read at step S5-3. When the color is within the color range data, the display image calculating block 202 at step S5-6 causes the processor to convert the color to the designation color. On the other hand, when the color is not within the color range data, the color remains unchanged.

After the step S5-6 or the step S5-5 is performed, the display image calculating block 202 at step S5-7 causes the processor to detect whether all the pixels of the original image are processed. When the result at step S5-7 is negative, the above steps S5-4 through S5-6 are repeated. When the result at step S5-7 is affirmative, the display image calculating block 202 at step S5-8 causes the processor to supply the resulting image data from the display image calculating block 202 to the image displaying block 203, so that the resulting image is displayed on the display 107.

Figure 13A:
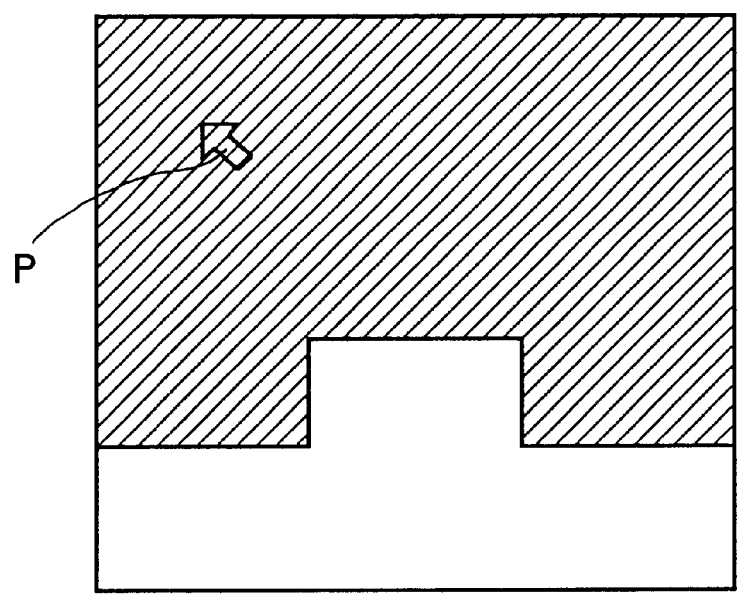
FIG. 13A and FIG. 13B are diagrams for explaining an operation of the display image calculating block.
Figure 13B:
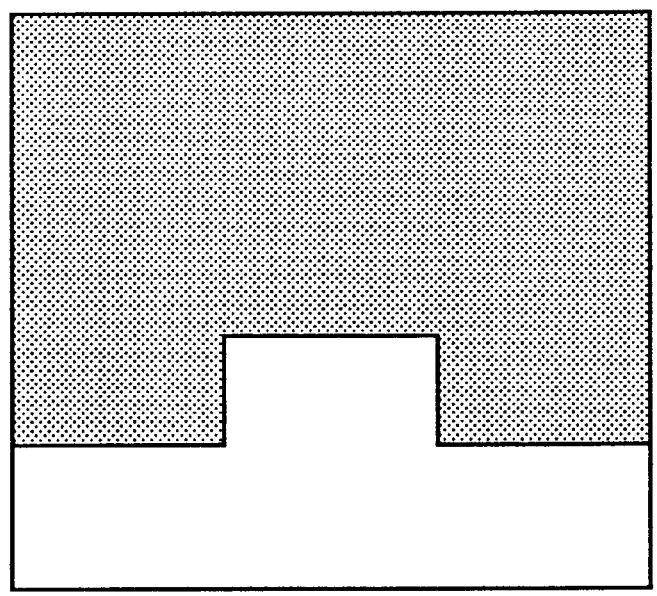

FIG. 13A and FIG. 13B show an operation of the display image calculating block 202. FIG. 13A is a diagram showing an original display image before the process of FIG. 12 is performed, and FIG. 13B is a diagram showing a display image after the process of FIG. 12 is performed.

As shown in FIG. 13A, the pointer "P" is placed at a designation position within a shaded area on the monitor of the display 107. When the pointer P is placed at the designation position, the operator clicks the mouse button 110a. Then, the display position designating block 204 causes the processor to input the designation pixel of the display image and the designation color.

After the process of FIG. 12 is performed, the color of the shaded area of the display image is converted to the designation color input by the operator. As shown in FIG. 13B, the color of the shaded area converted to the designation color is indicated by a dotted pattern.

In the above-described embodiment, the color designation unit (or the display position designating block 204) acts to input a designation color and determine a color of an arbitrarily-selected pixel of a display image by the input designation color. Alternatively, the color designation unit 204 may act to sequentially input a number of arbitrary pixels among pixels of the display image as the designation pixel. As shown in FIG. 8, the color designation unit 204 may act to input a designation range "S" of the display image on the monitor 300, so that a number of pixels contained in the designation range "S" are sequentially input as the designation pixel. By this modification, the color range designation apparatus and method of the present invention allows the operator to easily designate a color range at the designation range (the number of arbitrary pixels) of the display image by a desired color range at the operator's discretion.

The present invention is not limited to the above-described embodiment, and variations and modifications may be made without departing from the scope of the present invention.

Further, the present invention is based on Japanese priority application No.10-193,279, filed on Jul. 8, 1998, the entire contents of which are hereby incorporated by reference.

What is claimed is:

1. A color range designation apparatus comprising:
    a color designation unit receiving both a designated pixel of a displayed image and color data of the designated pixel;
    a color range data calculating unit determining a range between a minimum color and a maximum color for the designated pixel based on the color data received by the color designation unit; and
    a color range data storing unit storing the color range determined by the color range data calculating unit for the input designation pixel,
    wherein, when a color of a different pixel of the display image, input as the designation pixel of the display image, input as the designation pixel, falls outside the color range stored by the color range data storing unit, the color range data calculating unit determines a range between a minimum color and a maximum color for the designation pixel based on the different designation pixel, so that the stored color range is renewed by the determined color range.

2. The apparatus of claim 1, wherein the color designation unit inputs an arbitrary one of pixels of the display image as the input designation pixel.

3. The apparatus of claim 1, wherein the color designation unit sequentially inputs a number of arbitrary pixels among pixels of the display image as the input designation pixel.

4. The apparatus of claim 1, wherein the color designation unit receives a selected region of the displayed image, so that the color designation unit determines color data of a number of pixels contained in the selected region.

5. The apparatus of claim 1, wherein a color of a pixel of the display image is defined by a set of primary colors, the color range data calculating unit determining a range between a minimum color and a maximum color with respect to each of the primary colors for the input designation pixel.

6. A color range designation method comprising:
    receiving both a designated pixel of a displayed image and color data of the designated pixel;
    determining a range between a minimum color and a maximum color for the designated pixel based on the color data; and
    storing the color range determined for the input designation pixel,
    wherein, when a color of a different pixel of the display image, input as the designation pixel, falls outside the stored color range, a range between a minimum color and a maximum color for the designation pixel is determined based on the different designation pixel, so that the stored color range is renewed by the determined color range.

7. The method of claim 6, wherein an arbitrary one of pixels of the display image is input as the input designation pixel.

8. The method of claim 6, wherein a number of arbitrary pixels among pixels of the display image are sequentially input as the input designation pixel.

9. The method of claim 6, wherein a selected region of the displayed image is received, so that color data of a number of pixels contained in the selected region is determined.

10. The method of claim 6, wherein a color of a pixel of the display image is defined by a set of primary colors, and a range between a minimum color and a maximum color with respect to each of the primary colors is determined for the input designation pixel.

11. A computer readable medium storing program code for causing a processor to execute a color range designation, comprising:
    a program code device causing the processor to receive both a designated pixel of a displayed image and color data of the designated pixel;
    a program code device causing the processor to determine a range between a minimum color and a maximum color for the designated pixel based on the color data received; and
    a program code device causing the processor to store the color range determined for the input designation pixel,
    wherein, when a color of a different pixel, input as the designation pixel, falls outside the stored color range, a range between a minimum color and a maximum color for the designation pixel is determined based on the different designation pixel, so that the stored color range is renewed by the determined color range.

12. The computer readable medium of claim 11, wherein an arbitrary one of pixels of the display image is input as the input designation pixel.

13. The computer readable medium of claim 11, wherein a number of arbitrary pixels among pixels of the display image are sequentially input as the input designation pixel.

14. The computer readable medium of claim 11, wherein a selected region of the displayed image is received so that color data is determined of a number of pixels contained in the selected region.

15. The computer readable medium of claim 11, wherein a color of a pixel of the display image is defined by a set of primary colors, and said second program code device determines a range between a minimum color and a maximum color with respect to each of the primary colors for the input designation pixel.

16. A method, comprising:

displaying a display image, wherein the display image includes color data;

receiving at least one designated pixel and at least one designated color from a user, wherein the at least one designated pixel and the at least one designated color are included within the display image;

determining at least one set of pixel data based on the at least one designated pixel and the at least one designated color, wherein the at least one set of pixel data comprises at least one set of primary colors RGB;

determining a range between a minimum color and a maximum color for each of the primary colors RGB based on the at least one set of pixel data;

reading the color data for each pixel of the display image; and when the color data for a particular pixel of the display image is within the range, converting the color data of the particular pixel to the color data of the designated color.

* * * * *